W. P. HUGUELET.
CARBURETER.
APPLICATION FILED FEB. 10, 1912.
1,115,543.
Patented Nov. 3, 1914.
3 SHEETS—SHEET 1.
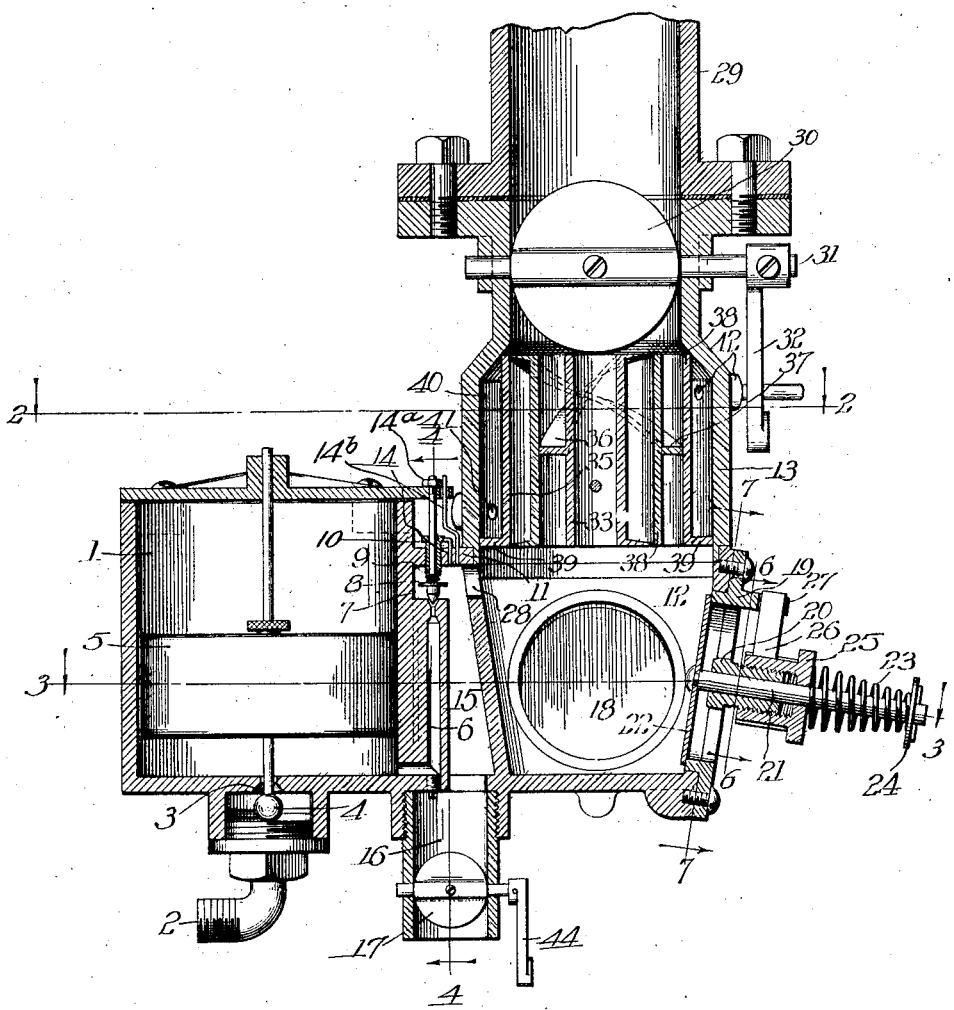

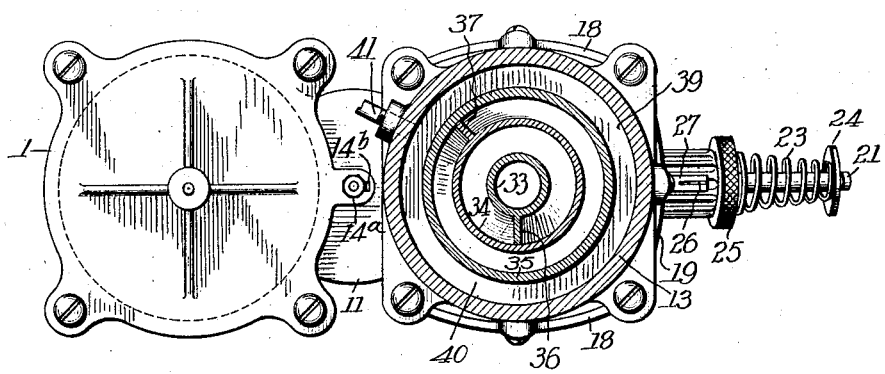
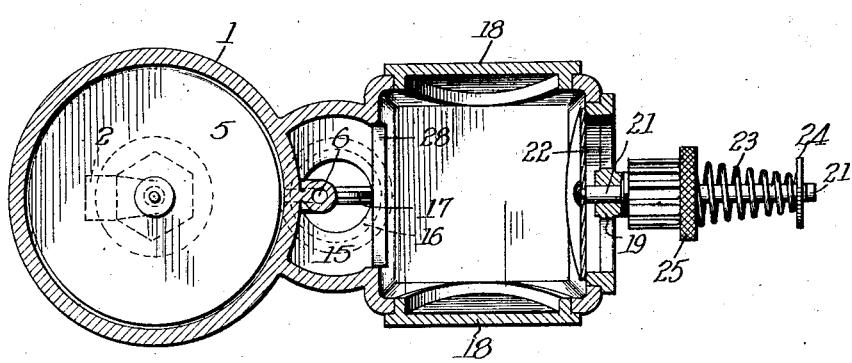

W. P. HUGUELET.
CARBURETER.
APPLICATION FILED FEB. 10, 1912.
1,115,543.
Patented Nov. 3, 1914.
3 SHEETS—SHEET 3.
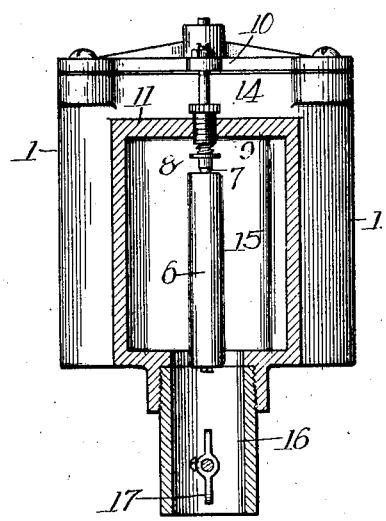
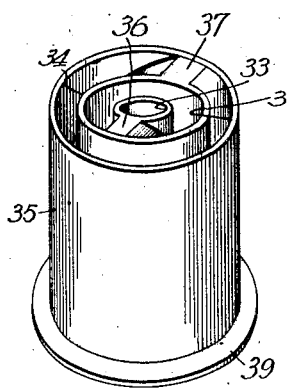
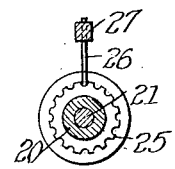
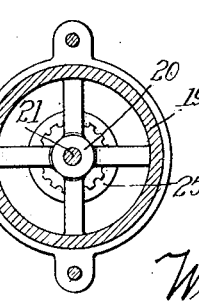
Witnesses:
Robert H. Weir
Arthur W. Carlson
Inventor
William P. Huguelet
By Rudolph M. Lotz, atty.

UNITED STATES PATENT OFFICE.

WILLIAM P. HUGUELET, OF CHICAGO, ILLINOIS.

CARBURETER.

1,115,543.     Specification of Letters Patent.     Patented Nov. 3, 1914.

Application filed February 10, 1912. Serial No. 676,918.

*To all whom it may concern:*

Be it known that I, WILLIAM P. HUGUELET, citizen of the United States, residing at Chicago, in the county of Cook and State of Illinois, have invented certain new and useful Improvements in Carbureters for Internal-Combustion Engines; and I do hereby declare the following to be a full, clear, and exact description of the invention, such as will enable others skilled in the art to which it appertains to make and use the same.

This invention has for its object to provide an efficient carbureter for internal combustion engines, and consists in the features of construction and combinations of parts hereinafter fully described and claimed.

In the accompanying drawings illustrating the invention, Figure —1— is a view in central vertical longitudinal section of a carbureter embodying my invention. Fig. —2— is a view partly in plan and partly in horizontal section on the line 2—2 of Fig. —1—. Fig. —3— is a horizontal section on the line 3—3 of Fig. —1—. Fig. —4— is a fragmentary detail vertical section on the line 4—4 of Fig. —1—. Fig. —5— is a fragmentary detail perspective view of the core of the air conduit showing a plurality of concentric passages for air and the helical ribs or flanges which serve to conduct the air through the same. Fig. —6— is a fragmentary detail sectional view on the line 6—6 of Fig. —1— showing the means employed for maintaining an adjustable nut in position. Fig. —7— is a fragmentary detail sectional view on the line 7—7 of Fig. —1—.

The main object of the invention is to provide a carbureter of the class described in which the richness of admixed hydro-carbon vapor and air or carbureted air drawn into the engine may be regulated to a very nice degree, and in which, at the same time, a thorough admixture of air and vapor is insured whereby efficiency and economy of the engine are promoted.

The carbureter comprises the usual float chamber 1 connected by means of a pipe 2 with a source of supply of hydro-carbon liquid, the latter passing into said chamber 1 through the opening 3 controlled by the valve 4 mounted upon the stem of the float 5 contained in said chamber 1 and adapted, when said chamber 1 is filled to the requisite or normal level with the hydro-carbon liquid, to shut off further supply thereto.

Adjacent the chamber 1 and communicating therewith is a discharge nozzle 6 for the hydro-carbon liquid into the air passages or chambers of the carbureter. The said nozzle 6 is controlled by means of the pin valve 7 seated upon the discharge end of said nozzle, the stem of said valve being provided between its ends with a disk 8 against which a helical compression spring 9 bears, the latter bearing at its other end against an adjustable screw 10 having a central longitudinal opening therethrough and which is mounted in a horizontal wall 11 of the carbureter between the chamber 1 and the air chamber 12 and conduit chamber 13 of the device, the stem of said valve 7 passing through and being guided in the opening in said screw 10. The said nozzle 6 is disposed in an air passage 15 which communicates at one end with the air inlet 16 controlled by the valve 17 and at its other end with the air chamber 12. The latter is substantially rectangular in form and is provided with inclined side walls in each of three of which is a circular opening. Two of these openings are adapted to be maintained normally closed by means of plates 18 suitably secured by means of screws, or the like, to said walls, while in one of said openings a ring 19 is adapted to be received which carries a centrally disposed hub 20 externally threaded and through which the stem 21 of a valve 22 passes and is guided. The latter consists of a flat disk seating at its peripheral portion upon the inner face of said ring 19. Said valve is maintained normally on its seat by means of the spiral compression spring 23 interposed between a collar 24 on the outer end of the valve stem 21 and an adjusting nut 25 mounted upon the said hub 20. The said nut 25 is provided externally with a plurality of longitudinal grooves or recesses in which the free end of a flat spring 26 engages, the latter being secured at its other end in a lug or projection 27 of said ring 19. Said nut serves to regulate the pressure exerted by said spring 23 on said valve 22, as will be obvious.

The air admitted through the air passage 15 and carrying the hydro-carbon vapors passes into the air chamber 12 through the opening 28, or, in the event that the valve 17 is closed the hydro-carbon vapor discharged into said air passage 15 from said nozzle 6 will pass into said air chamber 12 and be there admixed with the air entering said chamber through the opening controlled by the valve 22. The admixed air and vapor or carbureted air passes thence through the air conduit 13 and thence through the pipe or conduit 29 to the engine cylinder. The said air passage or conduit 13 is controlled by means of a throttle valve 30 mounted on a stem 31 adapted to be connected by means of a crank 32 with an opening lever, said valve-controlled end portion of said passage being of less diameter than the lower portion thereof. In the latter there is mounted a series of concentric tubes 33, 34 and 35 of successively larger diameter so as to provide annular air passages between the tube 33 and the tube 34 and between the tube 34 and the tube 35. The said tubes 33 and 34 are provided externally with oppositely trained helical ribs 36 and 37 which are adapted to cause air passing through the annular spaces occupied by said ribs to travel helically into the valve-controlled end portion of said conduit 13. Each of said helical ribs extends through an arc of substantially 360 degrees, but this arc may be varied without materially affecting the operation of the device.

The inner diameter of the tube 35 is preferably equal to the inner diameter of the valve-controlled end portion of the conduit 13 and at its upper end abuts against an annular shoulder 38 to which it is secured by soldering or other suitable means to provide a fluid-tight joint. At its lower end said tube 35 is provided with an annular flange 39 which is equal in outer diameter to the inner diameter of the lower end portion of the conduit 13 and is secured in the latter by soldering or other suitable means to effect a fluid-tight joint. The annular space 40 formed between the tube 35 and the circumferential wall of the lower end portion of the conduit 13 constitutes a heating or cooling chamber which may be connected by means of the flanged openings 41 and 42 with a source of supply of a cooling liquid or fluid and an exhaust for same or with a heating fluid such as the exhaust gases from the engine cylinders, the former being preferable during hot weather and the latter during very cold weather.

The operation of the carbureter will be very easily understood from the foregoing specification. The several openings closed by the plates 18 are provided so that the inlet valve 22 may be mounted in that part of the air chamber which is most conveniently located depending upon the location of the carbureter in a vehicle, for example, said plates 18 being interchangeable with the ring 19 carrying said valve, as will be obvious. The amount of hydro-carbon liquid fed from the nozzle will depend, of course, upon the degree of vacuum in the air chamber 12 and parts connected therewith. This degree of vacuum is primarily regulated by the position of the valve 17 and further by the degree of compression exercised by the spring 23. When said valve 17 is entirely closed no air will be admitted to the air chamber 12 except through the opening controlled by the valve 22. To open said valve and admit air a certain degree of vacuum must be attained in the air chamber 12, and a greater degree of vacuum will obviously cause the valve 7 to open more fully thereby causing the discharge of a greater quantity of hydro-carbon liquid from the nozzle 6 than would be the case were the valve 17 open or partially open. Hence, when said valve 17 is closed a very rich carbureted air will be drawn into the engine cylinders thus providing the maximum efficiency for the latter. The said rich mixture is usually fed to the engine cylinders only when it is desired to start the engine as at such times a primary impulse of maximum force is desirable for obvious reasons. The said valve 17 is provided on its stem 43 with a crank 44 by means of which the same is suitably connected with an operating lever for controlling said valve.

The oppositely trained helical air passages coact with each other and with the central air passage to effect a very thorough and intimate commingling of all air and vapor so that uniformly carbureted air only will be admitted to the engine cylinders.

I claim as my invention:

1. A carbureter comprising an air chamber having an air inlet port, a valve controlling the same, a spring maintaining said valve normally closed, an air inlet passage adjacent said air chamber and communicating therewith, a manually operated valve controlling said passage, a discharge nozzle for hydro-carbon liquid disposed in said passage, a valve controlling the same maintained normally closed by a spring, a throttle valve in the discharge end of said air chamber, there being a plurality of concentric air passages between said chamber and said valve-controlled discharge end thereof, and oppositely trained helical ribs in two of said air passages adapted to promote intimate commingling of air and vapor during passage therethrough and through the discharge end of said air chamber.

2. A carbureter comprising an air chamber provided between its inlet and discharge ends with a plurality of concentric air passages, a helical rib in at least one of said passages, a normally closed spring actuated valve controlling the air inlet port to said air chamber, an air inlet duct contiguous to the inlet end of said air chamber and communicating therewith, a manually operable valve controlling said duct, a discharge nozzle for hydro-carbon liquid disposed within said duct, a normally closed spring-actuated valve controlling the mouth of said nozzle, means operable from the exterior of the casing for adjusting the pressure exerted by the springs controlling the last-named valve and the first-named valve respectively, and a manually operable throttle valve controlling the discharging end of said casing.

3. In a carbureter, a casing provided in one end with an air chamber and terminating at its other end in a delivery passage for carbureted air, a throttle valve controlling said passage, a plurality of concentric tubular members disposed between said air chamber and said delivery passage, helical ribs carried by two of said tubular members and oppositely disposed relatively to each other, a jacket for a heating or cooling fluid surrounding the outer of said passages, an air inlet duct contiguous to said air chamber and communicating at its delivery end with the latter, a manually operable valve controlling said duct, a valve-controlled discharge nozzle for hydro-carbon liquid disposed in the said duct, an air inlet port for said air chamber, and a normally closed spring actuated valve controlling said inlet port.

4. In a carbureter, a casing provided at one end with an air chamber, and at its other end with a delivery passage for carbureted air, there being a passage of greater diameter than said delivery passage between the latter and said air chamber, a plurality of concentric tubular members disposed in said intermediate passage, the largest thereof corresponding in diameter with said delivery passage and being provided at one end with an annular flange equal in diameter to said intermediate passage and between which and the opposing wall of said intermediate passage an annular jacket for a heating or cooling fluid is formed, helical ribs carried by two of the said concentric tubular members, said helical ribs oppositely disposed relatively to each other, a valve controlled inlet for air to said air chamber, and an air inlet provided with an inlet for a hydro-carbon fluid thereto.

In testimony whereof I have signed my name in presence of two subscribing witnesses.

WILLIAM P. HUGUELET.

Witnesses:
RUDOLPH WM. LOTZ,
MAE M. BOYLE.